Aug. 12, 1958  H. W. HOBDAY  2,846,792
CONTROL SYSTEM FOR FINISH LEVELERS
Filed Feb. 14, 1955  2 Sheets-Sheet 2
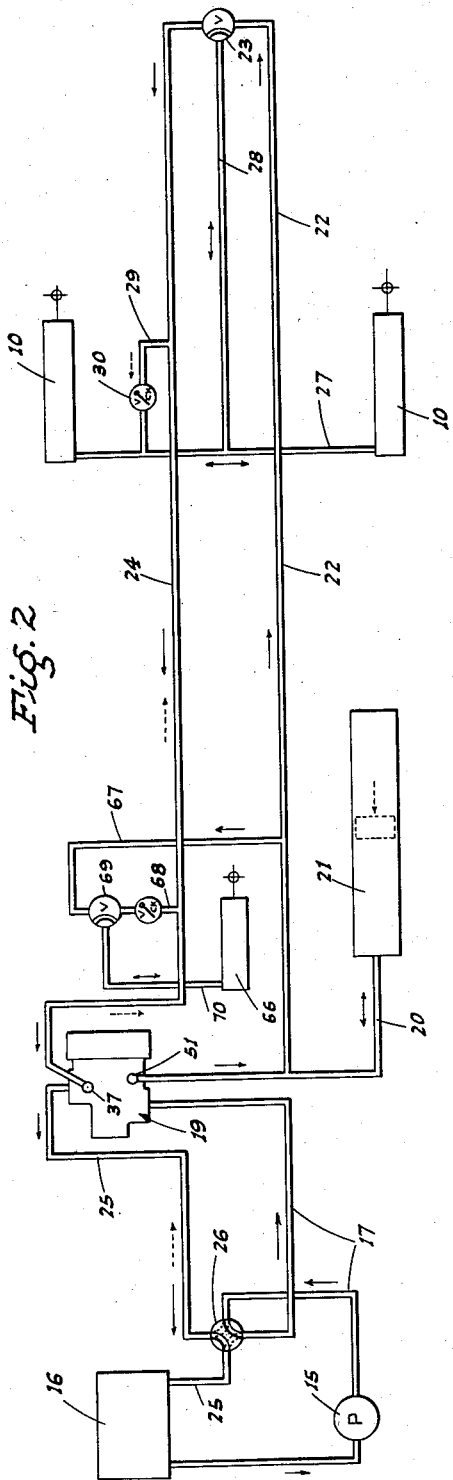
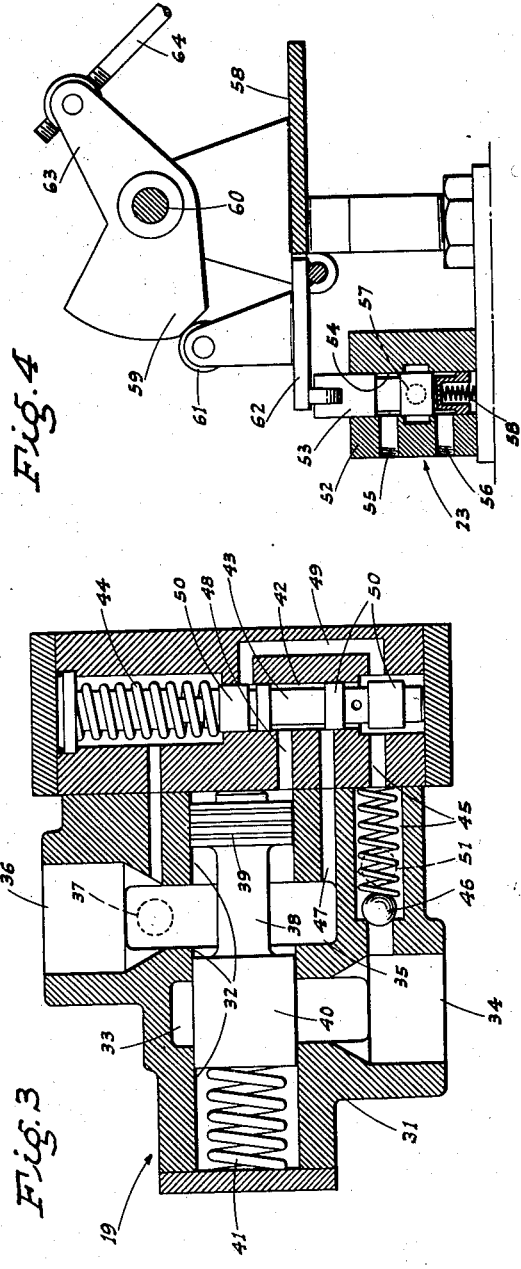
INVENTOR
*Harold W. Hobday*
BY
ATTORNEYS United States Patent Office 2,846,792
Patented Aug. 12, 1958

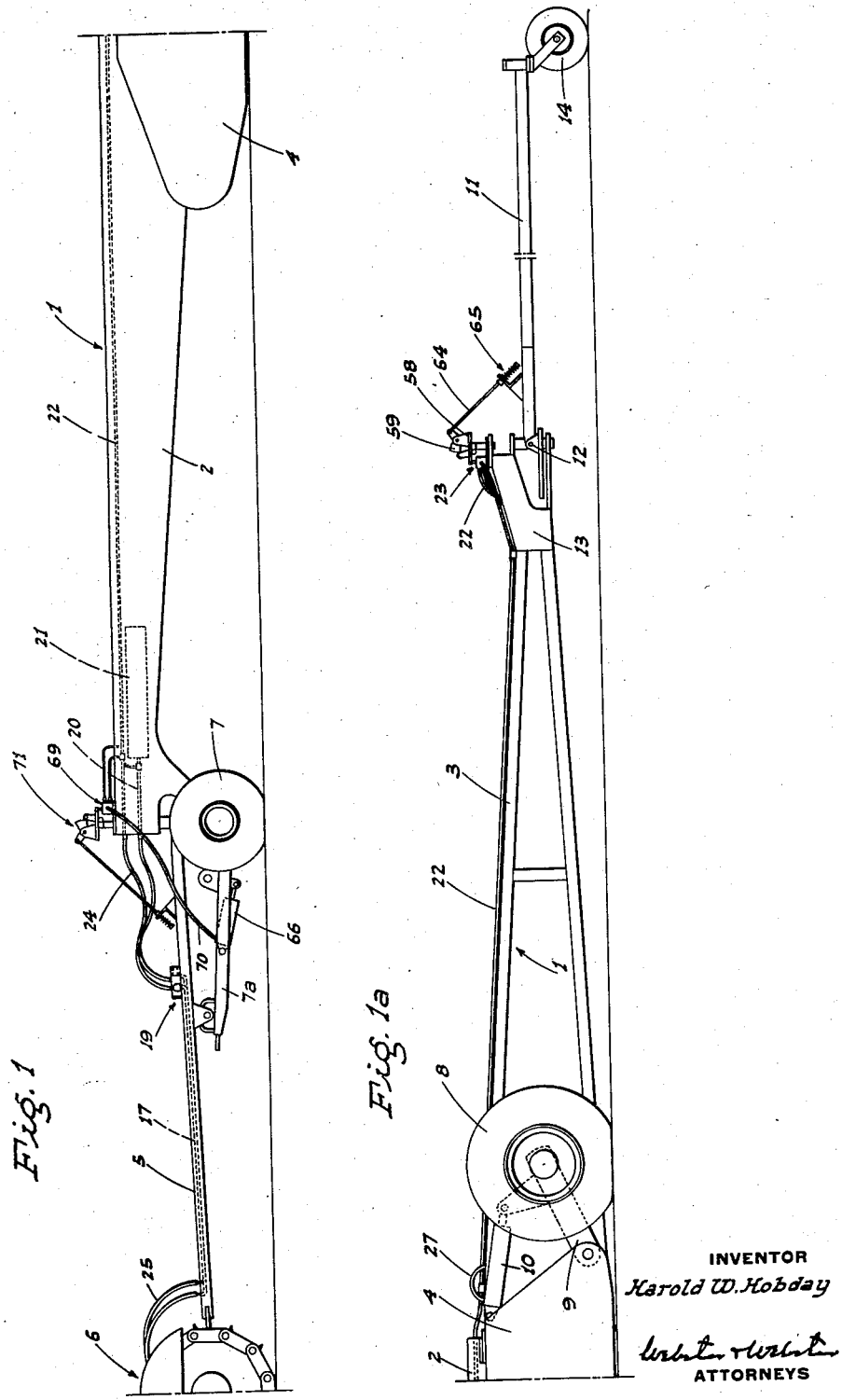

2,846,792

CONTROL SYSTEM FOR FINISH LEVELERS

Harold W. Hobday, Gilroy, Calif., assignor to Gurries Manufacturing Co., San Jose, Calif., a corporation of California Application February 14, 1955, Serial No. 487,741

3 Claims. (Cl. 37—180)

This invention relates to agricultural implements, and particularly to finish levelers of that type in which hydraulic rams are used to effect the adjustment of the leveler blade as the implement is drawn over the ground.

To actuate these rams, a supply of fluid under pressure must be maintained at all times, since the leveling actions, while intermittent, are apt to be required at frequent intervals. Such pressure is supplied by a constantly operating pump, and the major object of this invention is to provide a pressure supply system, which includes the pump, and in which the rams are interposed, so arranged that high pressure for fast ram action is stored up by the operation of the pump, while at the same time the pump is running free as long as such operating pressure exceeds a predetermined minimum. This prevents extreme heat being generated in the pump, which tends to burn the same out, and thus enables the system to be connected to and operated by the pump of the tractor to which the implement is attached, without any damage being done to the pump even with long continued operation thereof.

The hydraulic system includes conduits leading to and from the rams and in which a control valve is interposed; this valve being operated automatically, as the implement passes overe uneven terrain which is being leveled, so as to feed fluid to or allow the same to drain from the rams as the leveling conditions require. However, it is not feasible to utilize this valve to cause the leveler blade to be lifted, and held lifted, to the extent necessary to allow the implement to be transported from place to place with a high ground clearance of the blade.

It is therefore another object of this invention to provide means, operable manually from the tractor, whereby the fluid under pressure may be caused to bypass said automatic valve and feed directly to the rams to actuate the same in a blade raising direction, so that the blade may be held in a raised transport position regardless of irregularities in the terrain over which the implement may move while being transported.

A further object of the invention is to provide a practical and reliable control system for finish levelers, and one which will be exceedingly effective for the purpose for which it is designed.

These objects I accomplish by means of such structure and relative arrangements of parts as will fully appear by a perusal of the following specification and claims.

In the drawings:

Fig. 1 is a side elevation of the forward portion of a tractor-drawn leveler equipped with my improved control system.

Fig. 1a is a similar view of the rear portion of the leveler.

Fig. 2 is a diagram of the fluid control system of the leveler.

Fig. 3 is an enlarged sectional elevation of the unloading valve used in the control system.

Fig. 4 is an enlarged fragmentary elevation, partly in section, of the automatic ram control valve and the operating mechanism therefor.

Referring now more particularly to the drawings and to the characters of reference marked thereon, the leveler here depicted is substantially the same as that shown in my copending application for patent, Serial No. 436,130, filed June 11, 1954, now Patent No. 2,792,651. Such leveler includes an elongated rigid main frame 1, which comprises a forward section 2 of box-beam construction in section, and a rear section 3 of skeleton construction. A leveling bowl 4 having the usual scraping blade is rigidly secured to the frame 1 at the junction of sections 2 and 3. A draft tongue 5 projects forwardly from frame 1 and is connected to a tractor, indicated generally at 6.

The frame 1 is supported at its forward end by wheels 7, and adjacent and rearwardly of the bowl by rear wheels 8. Wheels 8 are mounted for vertical movement relative to the bowl and frame on pivoted arms 9. Hydraulic rams 10 extend between and are operatively connected to the frame and arms 9 so as to swing said arms down when fluid under pressure is fed to the rams at one end thereof.

Trailing from frame 1 is a control beam 11, pivotally supported at its forward end for vertical swivel movement, as at 12, from a yoke 13, on the rear end of said frame. The rear end of the beam is supported from the ground by a caster wheel 14.

The hydraulic system, to effect a relative lowering of the wheels 8 and a raising of the frame at bowl 4 upon upward swivel movement of beam 11, is arranged as shown particularly in Fig. 2. This system comprises a pump 15 drawing from a supply tank 16 and delivering pressure through a conduit 17 to an unloading valve, indicated generally at 19, and which is described more in detail hereinafter.

Another pressure conduit 20 leads from the valve 19 to a pressure accumulator or storage tank 21 of the spring or air-loaded type. From conduit 20 another conduit 22 leads to a three-way valve 23 mounted on yoke 13 and actuated by vertical swivel movement of beam 11 by a mechanism hereinafter described. A conduit 24, normally serving for pressure-return purposes, leads from valve 23 to the unloading valve 19, where it connects with another normally pressure-return conduit 25 leading to tank 16. A four-way manually controlled valve 26 is interposed between conduits 17 and 25, and is arranged so that in one position (which is that shown in full lines) the flow from the pump is directed through conduit 17 beyond the valve, and when the valve is turned to another position (as shown in dotted lines) the flow from the pump is diverted to conduit 25 and thence to conduit 24. The purpose of this feature will be seen later.

The rams 10 which control the raising and lowering of wheels 8 are connected by a conduit 27 from which a conduit 28 leads to valve 23; the latter being normally in a neutral position and being arranged to connect conduits 22 and 28, and conduits 24 and 28, in communicating relation, selectively. An auxiliary conduit 29 connects conduits 24 and 27, with a check valve 30 therein opening toward conduit 27.

With the above arrangement, and with the fluid pressure moving along conduit 22 toward valve 23, such pressure will feed to rams 10 through conduit 28 if the valve 23 is set accordingly, and will be held in the rams when valve 23 returns to neutral. Then when said valve is set to connect conduits 28 and 24, the fluid will flow back toward tank 16 from the rams. If, however, the valve 26 is set to direct the pressure flow from the pump through conduit 24, or in a reversed and bypassing relation to accumulator 21 and with valve 23 in the normal neutral position, such pressure will be fed to the rams through conduit 29 and conduit 27, extending the rams the desired extent. When such flow is halted by the return of valve 26 to its initial normal position, the fluid will be held in the rams, since the check valve 30 prevents a back flow through conduit 29. If, however, the valve 23 is then set to connect conduits 28 and 24, the fluid may flow back through conduit 24 from the rams in the normal manner.

The unloading valve, which in one form or another is an essential element of the system in order that a fluid-pressure supply may be maintained in conduits 20 and 22, is here shown as illustrated in the copending application of John Curlett, Serial No. 471,358, filed November 26, 1954, now Patent No. 2,779,346.

Such valve comprises essentially a body 31 having a relatively large blind-end bore 32 therein. This bore is intersected intermediate its ends by a main annular pressure chamber 33 leading to an inlet post 34 to which conduit 17 is connected, and by an annular or return chamber 35 leading to an outlet port 36 to which conduit 25 is connected. Chamber 35 is also provided with another port 37 to which conduit 24 is connected.

A bypass spool 38 is disposed in bore 32, said spool including a piston 39 in the portion of said bore beyond chamber 35 and a land 40 normally closing the portion of said bore which connects chambers 33 and 35. A spring 41 acts on the spool to yieldably maintain the same in such closing position and against movement by pressure acting on the piston 39 in the opposite direction.

Body 31 is also provided with another bore 42 in which another spool 43 is slidably mounted. A spring 44 acts to yieldably maintain the spool at one end of its limit of travel. A passage 45 in body 31 connects port 34 and the bore 42 adjacent one end thereof, and a spring-pressed check valve 46, opening toward bore 42, is mounted in passage 45. The body 31 is also formed with other passages 47 and 48, the former connecting chamber 35 and bore 42 and the latter connecting bore 42 and bore 32 at the end thereof beyond piston 39. Another bypass passage 49 in the body extends between and connects spaced points in the length of the bore 42. The spool 43 is formed with a number of lands 50 arranged in predetermined relationship to the bore 42 and the various passages connected thereto.

In operation, with the valve spools 40 and 43 in the position shown in Fig. 3, the pressure generated by the pump and forced into port 34 is blocked from return through conduit 25 by the land 40 of spool 38. The pressure therefore acts to open the check valve 46 so that such pressure will enter the port 51 to which conduit 20 is connected, in order that the pressure will flow to the accumulator 21 and build up therein. When spool 43 is moved upon a continued build-up of pressure in passage 45 sufficient to overcome spring 44, the pressure passes through passage 48 and engages the piston 39. Said piston is then moved against the resistance of the spring 41, which moves the land 40 so that communication is established between chambers 33 and 35, and the return flow from the pump to the tank 16 is unrestricted, relieving the pump of any heat-generating load. The pressure in the port 34 immediately drops, and the check valve 46 closes, thus confining the high pressure within the tank 21 and the communicating conduits and passages including passage 45.

This position of land 40 is maintained until the confined tank pressure drops—due to use of the pressure—to a predetermined minimum, whereupon retractive movement of the spool 38 establishes communication between passages 47 and 48, relieving the pressure from piston 39 and allowing the land 40 to return to its chamber-closing position. The ports are then restored to their initial position, as shown in Fig. 3, ready for another accumulator charging or loading operation, which only takes a short period of heavy-duty action of the pump.

It may be here noted that the unloading valve 19 is preferably mounted on the tongue 5, while the accumulator 21 is mounted within the hollow frame member 2, as shown in Fig. 1.

The valve 23 is mounted on top of yoke 13, and—as shown in Fig. 4—includes a body 52 having an upstanding valve spool 53 slidable in a bore 54. The body 52 is provided with upper and lower ports 55 and 56 and an intermediate port 57; all communicating with bore 54. Ports 55 and 56 are connected to conduits 22 and 24, respectively, while port 57 is connected to passage 28. A spring 58 tends to lift the spool 53, which is arranged so that when in a central neutral position communication between either of the ports 55 and 56, and the port 57, is shut off.

Mounted on the yoke above the valve is a platform 58 from which and above the same a cam 59 is mounted on a transverse pivot 60 disposed rearwardly of the valve 23. The cam bears down against an upstanding member 61 mounted on a plate 62 transversely pivoted on the platform 58 and bearing at its free forward end on the upper end of the spool 53.

A radial arm 63 projects upwardly and rearwardly from cam member 59 and is connected to a rod 64 which extends downwardly and rearwardly to a suitable connection 65 with the beam 11, as shown in Fig. 1a. With this arrangement beam 11, when level, acts on the cam 59 so that the spool is maintained in a neutral position against the action of spring 58 tending to lift the same. When the wheel 14 raises, due to a corresponding irregularity in ground contour, the cam 59 is turned so that spool 53 is lowered, placing ports 55 and 57 in communication with each other, causing fluid to be fed to the rams 10 with the corresponding relative lowering of wheels 8 to effect the desired leveling action.

In the particular finish leveler shown, the front wheels 7 are mounted for vertical movement relative to the frame 1 so as to provide an additional level-control means for the scraping bowl 4 which functions independently of the control means for wheels 8. To this end, said wheels 7 are mounted on a truck frame 7a, supported from frame section 2 and tongue 5, which itself is connected to said frame section for relative vertical swivel movement. A ram 66 is mounted on the truck frame 7a and is operatively connected to wheels 7 to thus relatively move the same.

Feed and return conduits 67 and 68 are connected to conduits 22 and 24, respectively, and to a control valve 69 mounted on the frame section 2 and of the same construction as valve 23, and from which another conduit 70 leads to ram 66. Operation of the valve 69 is controlled by a unit 71 connected between tongue 5 and frame section 2, and operated by vertical swinging movement of the tongue and frame 1, and which unit is a duplicate of that fully shown and described for the control of valve 23. Since it is not necessary to lift the implement frame at its forward end for transportation, the ram 66 is not provided with an auxiliary conduit, similar to conduit 29, for feeding fluid to said ram from conduit 24 when the flow of fluid therein is reversed.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A hydraulic pressure system for operating the blade-level controlling ram of a ground working implement including pressure and return conduits, a valve to which the conduits extend, a conduit from the valve to the ram, the pressure and return conduits being arranged for alternate connection with the last named conduit upon operation of the valve in opposite directions from a normal neutral position, means actuated by variation in ground level to so operate the valves upon travel of the implement along the ground, a separate conduit connecting the return conduit and the last named conduit, a check valve in said separate conduit opening toward the ram, and hand controlled means to feed fluid pressure to the return conduit.

2. A system, as in claim 1, in which said last named means comprises, with a source of pressure included in the hydraulic system, a hand valve interposed between and connected to the pressure and return conduits intermediate their ends and ahead of said separate conduit, said hand valve being arranged to allow an uninterrupted flow from the source of pressure through the pressure conduit beyond said hand valve, or to cause such pressure to flow from the source of pressure into the portion of the return conduit between the hand valve and said separate conduit, selectively.

3. A hydraulic system for operating the blade-level controlling ram of a ground working implement; said system including an accumulator tank, a pump to supply fluid under pressure to the tank, means to maintain pressure stored in the tank for use in the ram, a pressure conduit connected to the tank and leading toward the ram, a return conduit leading from the ram toward the pump, a combination pressure and return conduit connected to the ram and to the pressure and return conduits, an automatic level-controlled valve on the implement to place the combination conduit in communication with the pressure and return conduits, alternately, and means in the system and included in part with the return conduit and with the combination conduit to optionally feed fluid under pressure to the ram from the pump in bypassing relation to the tank and valve.

References Cited in the file of this patent

UNITED STATES PATENTS

| | | |
|---|---|---|
| 2,407,780 | Gurries | Sept. 17, 1946 |
| 2,420,394 | Gilman | May 13, 1947 |
| 2,689,513 | Ferguson et al. | Sept. 21, 1954 |
| 2,720,716 | White | Oct. 18, 1955 |
| 2,737,966 | Lucien | Mar. 13, 1956 |
| 2,787,066 | Johnson | Apr. 2, 1957 |